UNITED STATES PATENT OFFICE.

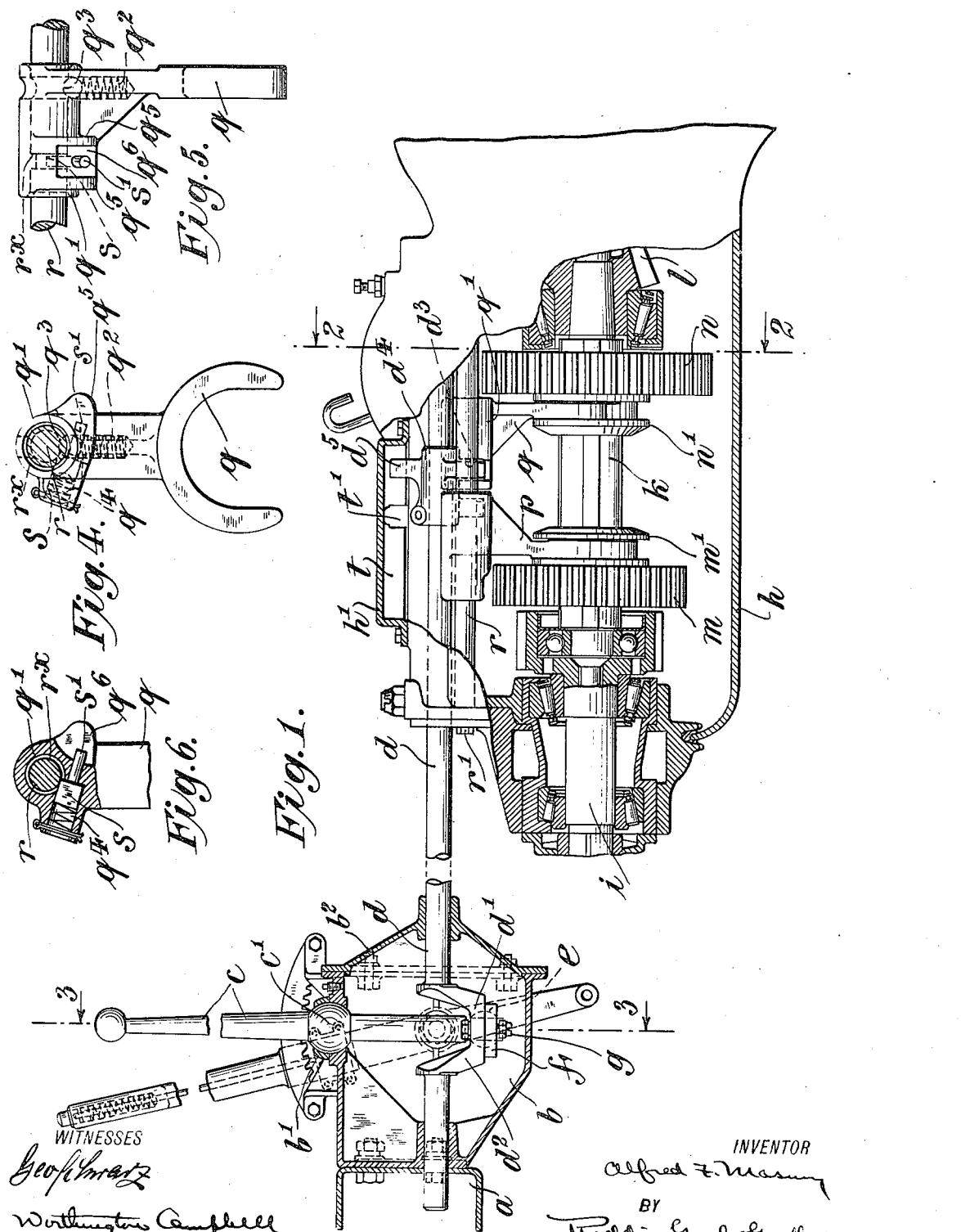

ALFRED F. MASURY, OF NEW YORK, N. Y., ASSIGNOR TO INTERNATIONAL MOTOR COMPANY, OF NEW YORK, N. Y., A CORPORATION OF DELAWARE.

GEAR-SHIFTING MECHANISM.

1,147,877. Specification of Letters Patent. Patented July 27, 1915.

Application filed March 13, 1915. Serial No. 14,250.

*To all whom it may concern:*

Be it known that I, ALFRED F. MASURY, a citizen of the United States, and a resident of the borough of Manhattan of the city of New York, in the State of New York, have invented certain new and useful Improvements in Gear-Shifting Mechanism, of which the following is a specification, reference being had to the accompanying drawings, forming a part hereof.

This invention relates to gear shifting mechanism and is designed primarily with reference to its use in motor cars.

The principal object of the invention is to provide devices of the character referred to which shall be simple in construction and invariable in operation.

The principal objection to gear shifting mechanisms now employed, particularly in motor trucks where the gear box is disposed at a point remote from the shifting lever, resides in the multiplicity of parts and the reliance placed upon the coöperation of auxiliary elements, which, when deranged, bring about injury to the gears by uncertain positioning thereof. In accordance with the present invention, the gear lever is connected directly to a sliding rock shaft, the longitudinal and angular position of which determines directly the positions of the sliding gears. The rock shaft carries, within the gear box, a finger which is movable into and out of engagement with suitable shifter forks, which are slidably journaled, respectively, on short shafts supported within the gear casing. The forks referred to are normally held against sliding movement by suitable locking devices interposed operatively between the forks and the respective supporting shafts and adapted to be released by the engaging finger on the rock shaft. The angular position of the rock shaft at all times may be determined by a slotted gate operatively disposed with respect thereto, and by means of which the proper positioning of the shifting lever is facilitated at all times.

Certain details of structure of the various elements hereinbefore briefly referred to will be pointed out as this description proceeds, reference now being had to the accompanying drawings for a detailed description of one embodiment of the invention, in which—

Figure 3:
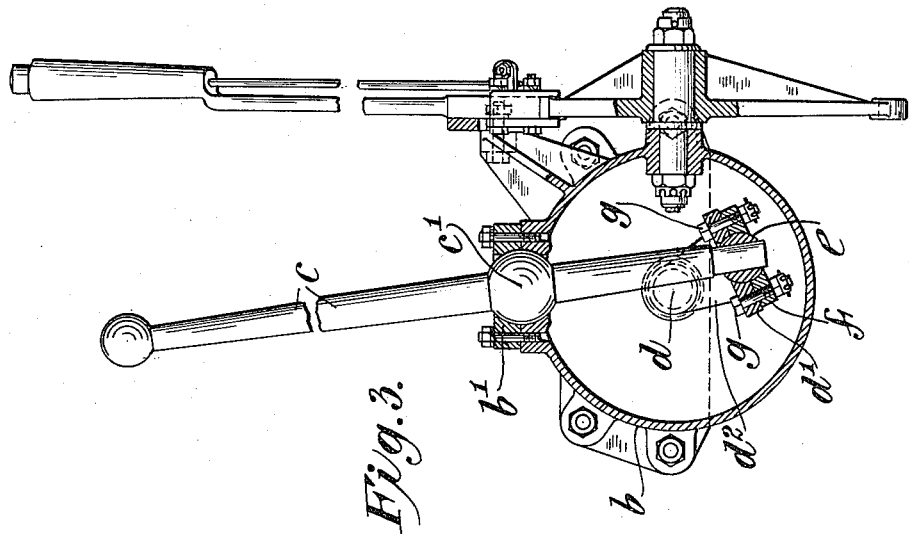
Figure 2:
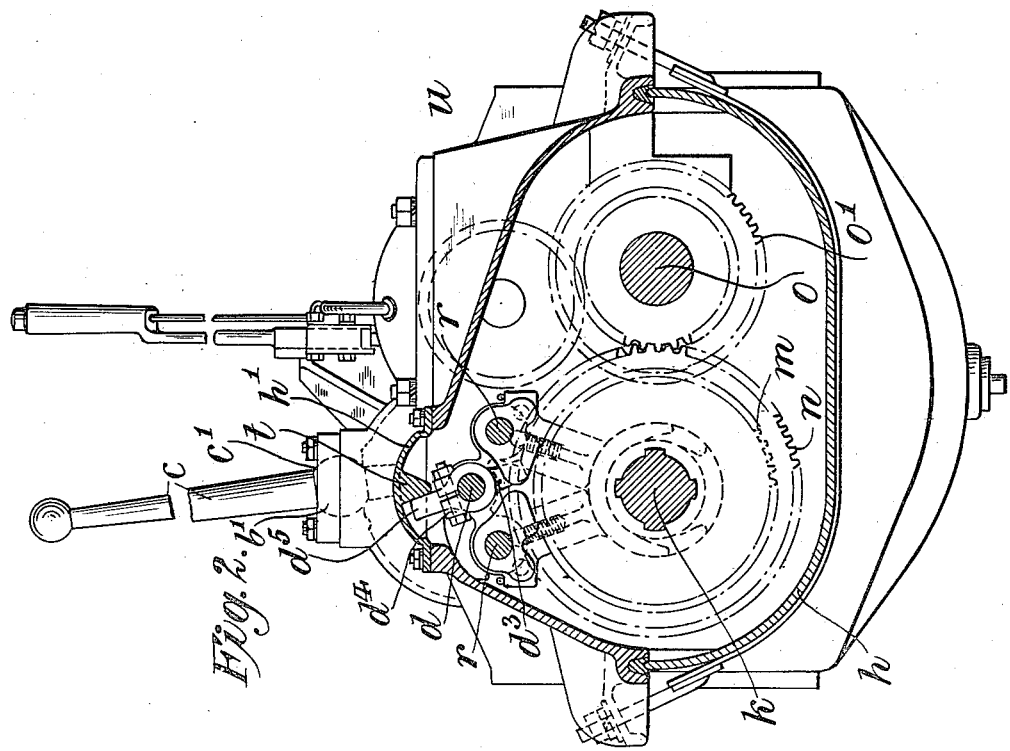

Figure 1 is a fragmentary view, partly in side elevation and partly in vertical section, of a gear box with sliding gears controlled through a gear lever by the improved devices. Fig. 2 is a sectional view taken through the gear box on the plane indicated by the line 2—2 of Fig. 1 and looking in the direction of the arrows. Fig. 3 is a sectional view taken on the plane indicated by the line 3—3 of Fig. 1 and looking in the direction of the arrows and showing particularly the improved gear lever and its connection with the rock shaft. Fig. 4 is a detail view in end elevation and on a somewhat larger scale of an improved shifter fork. Fig. 5 is a view in side elevation of the fork shown in Fig. 4.

As pointed out hereinbefore, this invention is concerned particularly with the shifting of gears in motor vehicles and the embodiment illustrated is intended to show such application of the invention, although it has been thought unnecessary to illustrate any of the parts of an automobile, with the exception of some such frame member as $a$, which may be supposed to be a transverse frame member on the chassis of a machine and to be adapted to the support of a housing $b$ for part of the gear shifting lever $c$ and part of the sliding rock shaft $d$, both of which extend into said casing and are provided with a pivotal union therein. The gear shifting lever $c$ may be formed intermediate its ends with a spherical boss $c'$ which may rest in a curved socket $b'$ formed in the top wall of the housing $b$ and intended to coöperate with the lever $c$ in such manner as to form a ball and socket joint and permit universal movement of the lever. The lower end of the lever $c$ extends loosely through a ball $e$ which may be clamped in position between interiorly curved plates $d'$, $f$, one of which, $d'$, may be integral with an off-set crank arm $d^2$ carried by the shaft $d$, and the other of which, $f$, may be held removably on said plate $d'$ by means of suitable bolts $g$.

As shown clearly in Fig. 1, the rock shaft $d$ is journaled horizontally in the walls of the housing $b$ and may pass through a cover plate $b^2$ detachably secured to the front of the housing and intended to permit ready access for purposes of repair, etc. The shaft $d$ has been shown as broken, in order to indicate that its length is determined by conditions of use and that transmitting elements, such as rods, universal joints, etc., may be interposed between its ends without departing from the spirit of this invention. For the convenience of this description, the shaft has been indicated as extending in a single plane directly into the gear casing $h$, so that it will be apparent that every movement of the gear lever $c$, whether lateral or longitudinal, will be transmitted directly to that part of the rock shaft $d$ which is within the gear casing $h$. Within the gear casing $h$ is journaled, as usual, a drive shaft $i$, in the inner end of which may be rotatably journaled a short drive shaft $k$ on the end of which is carried the driving bevel pinion $l$ and to which rotative movement is imparted through one or the other of the sliding gears $m$, $n$, which are feathered on the short shaft $k$. Within the gear casing $h$ is also journaled the counter shaft $o$ on which are fixedly carried other gears indicated at $o'$, of varying diameters, whereby the speed of the vehicle may be changed through the intermeshing of varying combinations of the gears $o'$, $m$, $n$, in a manner which will be understood. This invention is concerned with the sliding of the gears $m$, $n$, to their desired positions, upon the actuation of the gear lever $c$. In accomplishing this control, the gears $m$, $n$, have been formed on their faces with grooved hubs $m'$, $n'$, respectively, with which engage operatively shifter forks $p$, $q$, respectively, which are slidably mounted on supporting shafts or rods $r$ fastened to the end walls of the gear casing $h$ as through bolts $r'$. It will be noted that the shafts $r$ for the shifter forks $p$, $q$, are so positioned with respect to the rock shaft $d$ that a depending finger $d^3$, cast in a collar $d^4$, carried on the shaft $d$, can be swung into engagement with one or the other of the shifter forks $p$, $q$, by proper manipulation of the shaft $d$. Since the shifter forks $p$, $q$, are substantially identical in construction, except, perhaps for varying dimensions or shapes required for their accommodation in their relatively reversed positions, a description of one will serve equally well for an understanding of the construction of the other. Accordingly, only one of the shifter forks, $q$, has been illustrated in detail (see Figs. 4 and 5). The fork $q$ proper is preferably cast integral with a removable sleeve $q'$ through which the supporting shaft $r$ passes. In the body of the fork $q$ is disposed a spiral spring $q^2$, adapted to press upon a ball $q^3$, or the equivalent, which coöperates with a series of recesses formed in the supporting shaft $r$. These recesses, in each shaft $r$, will, of course, be positioned to correspond with the proper positions of the particular gear $m$, $n$, controlled by the forks $p$, $q$, so that the operator of the gear lever $c$ may feel these balls $q^3$ seat in the recesses and thereby know that the particular gear which is being shifted has reached a position in which it coöperates properly with one of the other gears on the counter shaft $o$. The hub or sleeve $q'$, or some integral part thereof, may also be provided with a recess $q^4$ extending tangentially with respect to the supporting shaft $r$ and in which may be disposed slidably a spring-pressed bolt $s$ which normally lies in one of a number of peripheral grooves $r^x$ cut along the supporting shaft $r$, so that when the fork $q$ with its controlled gear $m$ is in any one of the operative positions of the gear $m$, the fork will be held against further axial movement by the bolt $s$. However, this bolt $s$ is formed at one end with an extension $s'$ of reduced diameter which is engaged by the finger $d^3$ on the shaft $d$ when the finger is swung into operative relation with respect to the sleeve $q'$ in readiness for sliding of the sleeve along the supporting shaft for the purpose of shifting the gear $m$. In its movement into operative position with respect to the sleeve $q'$, the finger $d^3$ is intended to slide between two ears $q^5$ formed integral with the sleeve and constituting, by their spaced relationship, a recess $q^6$, through the base of which the end $s'$ of the locking bolt $s$ may protrude. From this description, it will be evident that movement of the finger $d^3$ to position within the recess $q^6$, will serve automatically to bring about the retraction of the locking bolt $s$ and the release of the sleeve $q'$, so that the sleeve with the fork $q$ is free to slide along the supporting shaft against the yielding engagement of the ball $q^3$ with the recess in which it is seated.

In the preferred embodiment, the collar $d^4$ has formed therewith, in a position diametrically opposed to the actuating finger $d^3$, an upwardly extending finger $d^5$ which lies in juxtaposition to the side of a rib $t$ formed on the inner face of the gear casing $h$, in the illustrated embodiment, on the inner face of the cap $h'$ for the gear casing. The rib $t$, which extends longitudinally of the shaft $d$ and lies substantially in the same vertical plane therewith, is slotted transversely, as at $t'$, and this slot is formed of such width as to permit the passage therethrough of the upwardly extending finger $d^5$, thereby enabling the rock shaft $d$ to be moved from one angular inclination to another, when the gears are in neutral position. By this simple construction, it becomes necessary for the operator to so manipulate the gear lever $c$ as to bring the gear finger $d^5$ opposite the slot $t'$ before the shaft $d$ can be rocked to engage the depending finger $d^3$ with the shifter fork not previously engaged. Again, when the gears are in neutral position and the upwardly extending finger $d^5$ lies within the slot $t'$, the depending finger $d^3$ rests in a vertical position out of contact with the locking bolts $s$ in each of the shifter forks $p, q$, thereby insuring the retention of the forks in proper position until the operator moves the gear lever to shift the gears, as will be understood.

The description of the structural features which has thus far been given will doubtless enable the operation of the various elements to be understood, but it may be helpful to have a brief description of the improved mechanism, considered as a whole. It may first be assumed that the gear lever $c$ is in neutral position. At this time, the upwardly extending finger $d^5$ rests in the slot $t'$ and neither of the gears $m, n$, is in driving engagement with any of the other gears $o'$. When the operator desires to start the car he moves the shifting lever $c$ laterally so as to rock the shaft $d$ and carry the finger $d^5$ out of the slot $t'$ and simultaneously bring the depending finger $d^3$ into operative relation with one of the shifter forks, as into the recess $q^6$ of the shifter fork $q$. The shifting lever $c$ can then be rocked longitudinally with respect to the shaft $d$ so as to slide the shaft $d$ axially and move the depending finger $d^3$ with the engaged shifter fork $q$ along the supporting shaft $r$ of the fork, it being understood that during this movement, the finger $d^3$ holds the locking bolt $s$ in retracted position and out of engagement with the transverse peripheral grooves in the supporting shaft $r$. By this sliding movement, the sliding gear $n$ is carried along the short shaft $k$ until it is brought into mesh with one of the gears $o'$ or, perhaps, with the reversing idler $u$. When the gear $n$ has been brought into mesh with that gear which gives the desired speed ratio, the operator will know that the gears are in proper relation by feeling the ball $q^3$ engage the proper recess in the supporting shaft $r$. When some other speed ratio is desired, the gear $n$ may be slid to some other position through the sliding of the shaft $d$ or the gear $m$ may be moved into mesh with one of the gears $o'$ by first passing the finger $d^5$ through the slot $t'$, thereby bringing the depending finger $d^3$ into operative relation with the shifter fork $p$ and then sliding the shaft $d$ and shifter fork $p$ to the desired position. The gate formed by the slotted rib $t$ affords the same indication as does the well known H-gate, now commonly employed, and yet it is of much greater simplicity. The shifting lever $c$ by its construction permits of a complete control of the sliding gears without necessitating any great range of movement of its upper end.

The improved mechanism while very compact and simple in construction, permits the direct control of the gears regardless of the disposition of the gear housing $h$ with respect to the shifting lever $c$ since all of the shifting devices proper are disposed within the gear housing and are directly connected with the gears, it being a very simple mechanical problem to transmit the movements of the lever $c$ to the gears.

Rearrangements of the parts and changes in the details of the construction of the various elements may be made without departing from the spirit of the invention, provided such rearrangements and changes fall within the scope of the appended claims.

I claim as my invention:

1. The combination with sliding gears, of gear shifting mechanism comprising a slidable rock shaft, independent shafts, shifter forks slidably mounted on said last named shafts respectively and engaging the sliding gears respectively, devices carried on the rock shaft and adapted to be engaged with one or another of the shifter forks to connect the rock shaft operatively with one of the forks, and means to operate the rock shaft.

2. The combination with sliding gears and the casing therefor, of gear shifting mechanism comprising a slidable rock shaft in said casing, independent shafts in the casing, shifter forks slidably mounted on said last named shafts respectively and engaging the sliding gears respectively, devices carried on the rock shaft and adapted to be engaged with one or another of the shifter forks to connect the rock shaft operatively with one of the forks, and means to operate the rock shaft.

3. The combination with sliding gears and the casing therefor, of gear shifting mechanism comprising a slidable rock shaft journaled in said casing, independent shafts in the casing, shifter forks slidably mounted on said last named shafts respectively and engaging the sliding gears respectively, a collar fixed on the rock shaft, a finger carried by the collar and movable into engagement with one or another of the shifter forks when the rock shaft is rocked, whereby the rock shaft is connected with one of the forks, and means to operate the rock shaft.

4. The combination with sliding gears and the casing therefor, of gear shifting mechanism comprising a slidable rock shaft journaled in said casing, independent shafts mounted in the end walls of the casing and extending parallel with the rock shaft and disposed respectively on opposite sides thereof, shifter forks slidably mounted on said last named shafts respectively and engaging the sliding gears respectively, a finger fixed on the rock shaft, ears carried on the shifter forks and adapted to be engaged by the finger when the rock shaft is oscillated, locking devices carried by the shifter forks to hold the forks against sliding movement, said devices being released automatically by movement of the finger into operative relation with said ears, and means to operate the rock shaft.

5. The combination with sliding gears and the casing therefor, of gear shifting mechanism comprising a slidable rock shaft journaled in the casing, independent shafts in the casing, shifter forks slidably mounted on the last named shafts respectively and engaging the sliding gears respectively, a spring-pressed sliding bolt mounted in each fork and adapted to lie within coöperating transverse peripheral grooves formed in the supporting shaft of each fork, a finger fixed on the rock shaft and adapted to be moved into operative engagement with one or another of the forks when the rock shaft is oscillated, said finger when in such operative relation to each fork abutting against the sliding bolt and retracting it from locking engagement with the peripheral groove, and means to operate the rock shaft.

6. The combination with sliding gears and the casing therefor, of gear shifting mechanism comprising a slidable rock shaft journaled in the casing, independent shafts in the casing, shifter forks slidably mounted on said last named shafts respectively and engaging the sliding gears respectively, devices carried on the rock shaft and adapted to be engaged with one or another of the shifter forks to connect the rock shaft operatively with one of the forks, a rib formed on the inner wall of the gear casing and provided with a transverse slot therethrough, means carried on the rock shaft and positioned in operative relation to the rib, whereby the movement of the rock shaft is limited by the rib, and means to operate the rock shaft.

7. The combination with sliding gears and the casing therefor, of gear shifting mechanism comprising a slidable rock shaft in said casing, independent shafts in the casing, shifter forks slidably mounted on said last named shafts respectively and engaging the sliding gears respectively, means carried on the rock shaft to engage said shifter forks respectively, an upwardly extending finger carried on the rock shaft, a removable cover plate disposed in the top wall of the casing over the rock shaft, a rib on the inner face of the cover plate extending longitudinally of the rock shaft and disposed substantially in the same vertical plane therewith and formed with a transverse slot, the finger on the shaft being disposed in operative relation to the rib and movable through the slot therein, whereby the movement of the rock shaft is limited by the rib and means to operate the rock shaft.

8. Gear shifting mechanism including a shifting lever, a ball and socket support therefor permitting universal movement thereof, a rock shaft, a crank arm carried by the rock shaft, a socket formed in the arm, and a ball mounted removably in the socket and provided with an aperture to receive loosely the end of the lever, whereby a sliding and rocking movement of the shaft by the arm is permitted.

9. Gear shifting mechanism comprising in combination, a shifting lever, a rock shaft, a housing into which the lever and the rock shaft extend, a crank arm carried by the rock shaft, means connecting the lever with the arm within the housing to permit universal movement of the lever and the rock shaft, sliding gears, a gear casing therefor into which the rock shaft extends, independent shafts in the gear casing, shifter forks mounted slidably on the last named shafts respectively and engaging the sliding gears respectively, and devices for engaging the rock shaft operatively with one or another of the forks to permit sliding of the gears selectively.

This specification signed and witnessed this 12th day of March, A. D. 1915.

ALFRED F. MASURY.

Signed in the presence of—
JAMES J. DONAHUE,
JAMES F. PRINCE.